United States Patent [19]
Dinger

[11] 3,812,409
[45] May 21, 1974

[54] CURRENT LIMIT CIRCUIT FOR A DC MOTOR

[75] Inventor: Edward H. Dinger, Waynesboro, Va.

[73] Assignee: General Electric Company, Salem, Va.

[22] Filed: Mar. 6, 1973

[21] Appl. No.: 338,616

[52] U.S. Cl.................. 318/310, 318/317, 318/331
[51] Int. Cl. .............................................. H02p 5/16
[58] Field of Search.................... 318/310, 317, 331

[56] References Cited
UNITED STATES PATENTS

| | | | |
|---|---|---|---|
| 3,604,996 | 9/1971 | Lutz............................... | 318/331 X |
| 3,555,387 | 1/1971 | Ulrich.................................. | 318/331 |
| 3,671,835 | 6/1972 | McMenamy..................... | 318/331 X |

Primary Examiner—B. Dobeck
Attorney, Agent, or Firm—Arnold E. Renner; Harold H. Green, Jr.

[57] ABSTRACT

A direct current motor control circuit of the type employing "phase controlled" semiconductors of the controlled rectifier type is provided with a current limiting function which serves to predict and limit the amount of current which will be applied to the motor. A full wave controlled rectifier bridge supplies power to the motor armature winding from an alternating current source and suitable control circuitry is provided which limits the percentage of time (i.e., phase control) during which the controlled rectifiers of the bridge are conductive to hence limit the armature current in a predictive manner to prevent excessive current within the motor armature circuit.

19 Claims, 6 Drawing Figures

CURRENT LIMIT CIRCUIT FOR A DC MOTOR

BACKGROUND OF THE INVENTION

The present invention relates generally to current control circuits for direct current (d.c.) motors and more particularly to a current control circuit for a d.c. motor which serves to predict the amount of current which will flow in the armature circuit by limiting the percentage of time during which controlled rectifiers of a supply bridge are conductive so as to prevent current levels from being reached, even transiently, which might damage circuit components, particularly the controlled rectifiers of the bridge.

The controlled rectifiers in most common use today are semiconductor devices generally known as thyristors and the most common of the thyristors is that device known as the silicon controlled rectifier. In the ensuing discussion, the term thyristor will be used although it is to be fully understood that the term is used to designate controlled rectifiers generally. A thyristor normally conducts only in one direction and conduction is initiated by the application of a forward bias voltage across its anode and cathode simultaneously with the application of a gating signal applied to a third or gating electrode. After conduction is initiated, a thyristor will continue to conduct until such time as the voltage applied across its anode and cathode goes to a sufficiently low value to extinguish the thyristor. This value is usually about zero volts.

Thyristors, like many electrical current carrying devices, are known to be particularly susceptible to damage by currents in excess of their capability, even though transient in nature, whereas devices such as motors can usually carry a current significantly over its rated value for short periods of time without damage.

It is known in the prior art that the speed of a direct current (d.c.) motor may be controlled by controlling the effective voltage applied thereto. One method of achieving this control is by supplying the motor with power from an alternating current (a.c.) source through a full wave rectification bridge. In order to control the voltage the bridge may utilize at least two thyristors in the two fundamental conducting paths and the effective voltage applied to the motor is varied by varying the percentage of time the thyristors are conductive. This, in the art, is known as phase controlling and is achieved by varying the phase angle, respect to the a.c. source, at which the thyristors are rendered conductive or "fired." By varying the phase angle is meant that the thyristor is fired at some preselected time within the applied half-wave cycle. This enables the effective voltage, as it is averaged over the total time, to be varied.

It is also known in the art to provide some form of over-current protection within the motor circuit to guard the several electrical components including the thyristors of the armature supply bridge. The customary method of providing this protection is to apply a voltage to the armature and then measure the current that flows in the armature. This current is then compared to a pre-established reference and the firing angle of the thyristors is adjusted in the appropriate direction to achieve the desired current. This system of current control has a major deficiency in that the circuit current, in this case in the motor armature winding, is committed before appropriate regulation is made; that is, the current must exist in the circuit in order to be measured. If this current is of sufficient magnitude and duration damage may occur before appropriate regulatory steps may be accomplished. Accordingly, it has been the practice in the prior art, in order to prevent damage to the rectifiers of the bridge, to provide thyristors of larger current carrying capability that would ordinarily be required in order that overcurrents of the magnitude and duration likely to be achieved will not be sufficient to damage these thyristors. Inasmuch the cost of a thyristor is normally a function of its current carrying capability, this represents an unnecessary expense. In addition, this system permits an overshoot in required voltage and current which may tend to give the motor an erratic speed profile.

SUMMARY OF THE INVENTION the foregoing deficiencies of the prior art are alleviated by the control system of the present invention which predicts the amount of current which will flow for a given motor and a given angle of firing. This is achieved in the present invention by recognizing the relationship between the thyristor firing angle and the armature current, as well as motor design characteristics such as open or enclosed construction, type of insulation system and base motor speed. Since the firing angle that is required to limit the current is a function of the operating speed, it being known that the reverse armature voltage (back emf) is proportional to the motor speed, the firing angle of the thyristors may be controlled based upon the existing back emf of the motor and the known motor characteristics. This is achieved in the present invention by properly scaling a signal representative of the armature voltage (back emf) and comparing that scaled signal to a reference signal which is set in accordance with the design electrical characteristics of the motor. This comparison is utilized to determine the earliest time at which the thyristors of the bridge may be fired.

DESCRIPTION OF THE DRAWINGS

For a better understanding of the present invention reference is made to the accompanying drawings in which.

DETAILED DESCRIPTION

Figure 1:
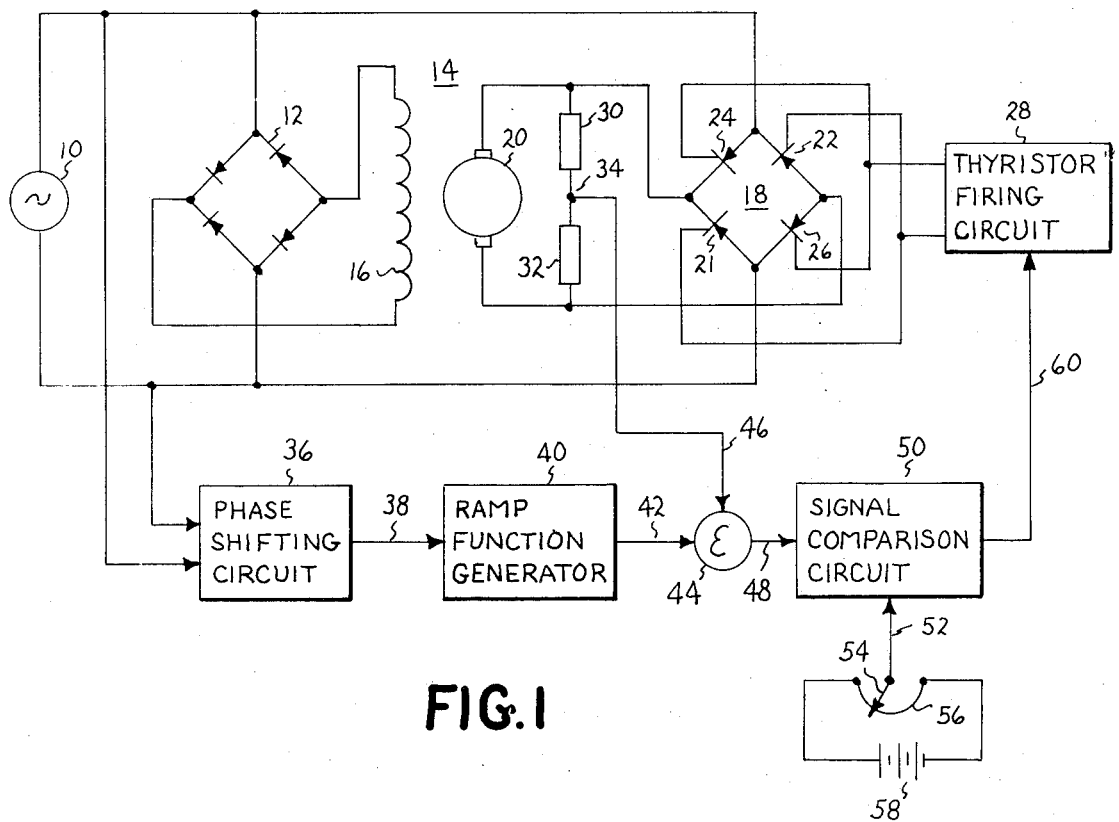
FIG. 1 is a schematic drawing of the control circuit in accordance with the present invention as applied to a d.c. motor control circuit.

Referencing first FIG. 1, there is shown an a.c. power source 10 across which is connected a full wave diode rectification bridge 12 the output of which serves to supply rectified a.c. power to a field winding 16 of a shunt wound d.c. motor shown generally at 14. A second full wave rectification bridge 18 is also connected across the power source 10 and its output is provided to an armature winding 20 of the motor 14. The bridge 18 is preferably comprised of four thyristors divided into a first pair including thyristors 21 and 22 and a second pair comprising thyristors 24 and 26. The thyristor pairs of the bridge 18 are selectively rendered conductive through the application of a suitable firing pulse applied to their individual gate electrodes from a firing circuit 28. As illustrated in FIG. 1 the two thyristors of each pair are fired simultaneously.

The thyristor firing circuit 28 is not shown in detail in that the details of this circuit do not form a part of the present invention and many such firing circuits are known. Basically, the thyristor firing circuit 28 is controllable such that it will apply a pulse to the appropriate pair of thyristors of the bridge 18 at a desired place within a respective half cycles of the applied a.c. input. The point at which this pulse is applied may be a function of a suitable manual setting or it may be under the control of some other operating parameter to which the motor is associated such that as the angle at which the thyristors are fired is varied, the effective voltage applied to the motor armature is varied and the speed and current of the motor are also varied accordingly.

It should be noted that the bridge 18, as was previously stated, is comprised of four thyristors. This differs from that which is a common in the art in that the prior art normally provides a bridge having two thyristors and two diodes. The prior art also normally includes a free-wheeling diode connected in parallel with the armature for reasons which are set out in more detail in the co-pending Pat. application Ser. No. 338,615 filed Mar. 6, 1973, "DC Motor Speed Control Circuit" by Edward Herman Dinger which application is assigned to the assignee of the present invention. Fundamentally, however, the full wave bridge utilizing four thyristors permits the omission of the free-wheeling diode known in the prior art and further permits the existence of a reverse voltage across the armature of the motor.

A suitable means is provided for sensing the armature voltage. In the illustrated embodiment this means is shown as a voltage dividing network connected in parallel with the armature and consisting of two resistors 30 and 32. The two resistors 30 and 32 are normally of a high value to prevent occurrence of any appreciable current through these resistors but such that there appears at their junction 34 a signal which is proportional to the voltage across the armature.

As is shown in FIG. 1, a phase shifting circuit 36 is connected across the a.c. source 10 to provide an output signal on a line 38 which is indicative of a prescribed phase displacement or shift with respect to that of the source 10. The phase shifting circuit 36 may be any of those known in the art including resistance-reactance networks but is preferably that which is shown and described in copending application Ser. No. 338,617 filed Mar. 6, 1973, "Voltage Compensated Phase Shifting Circuit" by Edward Herman Dinger, et al. which application is assigned to the assignee of the present invention.

The signal on line 38 forms an input to a suitable ramp function generator 40 and in accordance with the preferred embodiment of the present invention will serve to cause the ramp function generator to begin operation at a prescribed point within each half cycle of the voltage of the source 10 and to have a frequency twice of that of the source 10. The output signal of the ramp function generator 40 appears on line 42 and forms one input to a two input summing junction 44. The second input to the summing junction 44 is via a line 46 upon which line is a signal representing the value of the voltage across the armature 20 from the voltage divider network (point 34). There will, therefore, appear on an output line 48 of the summing junction 44 a signal which is the algebraic sum of the signals from the ramp function generator 40 and the voltage divider.

The signal on line 48 from the summing junction 44 forms one input to a signal comparison circuit 50. The signal comparison circuit 50 is of a type determined by the nature of its input signals, either voltage or current. A second input to the signal comparison circuit 50 is via line 52 from a slider 54 of a reference potentiometer 56. The reference potentiometer 56 which will be described in more detail hereinafter is connected across a suitable source of voltage supply which for terms of simplicity has been represented as a battery 58.

The output of the signal comparison circuit 50 is applied via a line 60 to the thyristor firing circuit 28. The signal on line 60 serves to inhibit the operation of the thyristor firing circuit regardless of what its normal control would specify until such time as the signal on line 48 exceeds that on 52. That is, the signal comparison circuit 50 compares two signals on lines 48 and 52 and provides a signal to the thyristor firing circuit to prevent normal operation of the firing circuit until such time as the signal on line 48 is equal to or greater than that on line 52.

It will be immediately obvious to those skilled in the art that the net effect of the junction 44 and the circuit 50 is the total combining of the signals presented on lines 42, 46 and 52. While this total combining is illustrated in the preferred embodiment as a two stage operation, the net effect could also be achieved in a single suitable summation circuit the output of which would correspond to that appearing on line 60 of the illustrated embodiment.

Figure 2:
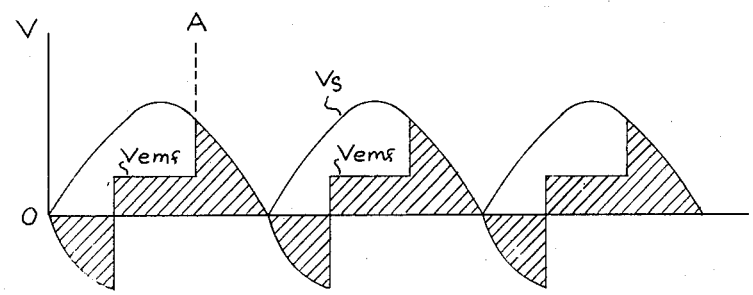
FIGS. 2 through 5 are wave shapes drawn to the same time base which are useful in the understanding of the present invention; and, FIG. 6 is a detailed schematic drawing showing one possible embodiment for use as one of the elements shown in block form in FIG. 1.

Before beginning a detailed description of the operation of the invention as shown in FIG. 1 it is believed desirable to reference the graphical illustrations of FIGS. 2 through 5 and their relevancy to the showing of FIG. 1. FIG. 2 first illustrates at $V_s$ the full wave rectified wave shape of the voltage of the source 10. Superimposed upon this depiction is a shaded area which represents a typical voltage across the armature 20. As it is more fully explained in the previously referenced application Ser. No. 338,615 the inclusion of the full thyristor bridge 18 permits the occurrence of a negative voltage across the armature and further insures that there exists a time during which the armature current will be zero to provide a true back emf indication of the motor. The back emf is shown as the horizontal portion of the shaded area in FIG. 2 and is designated $V_{emf}$. A sharp rise at the latter portion of each half cycle, shown at point A in the first half cycle, is the point of the firing of a thyristor to apply voltage from the bridge to the armature. In FIG. 2 the firing occurs at approximately 120° into the half cycle or stated in the more common terminology of the art, the firing angle is approximately 60°.

Figure 3:
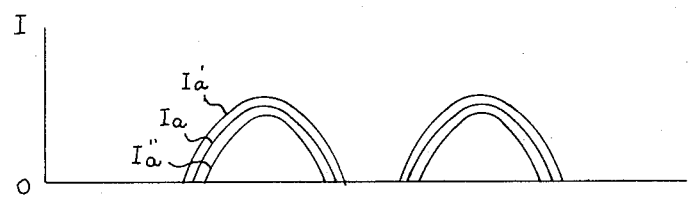

FIG. 3 depicts typical wave shapes of armature current for a given motor with the voltage of FIG. 2 applied. The center wave designated $I_a$ is illustrative of that current which would occur with a firing angle of approximately 60°. The larger wave shape designated $I_a'$ represents the current flowing in the same motor at a slightly larger firing angle, for example 70°, while the smaller wave shape $I_a''$, is that which would occur in the event of a smaller angle, for example 50°.

Referencing once again FIG. 1 it will be remembered that the potentiometer 56 was stated to be adjustable to provide a reference signal on line 52. This potentiometer is designed to provide a reference signal which corresponds to the value of the required signal for some prescribed angle of firing to give the desired armature current. It is made adjustable because, as was previously indicated, different motors have different operating characteristics. Typically, motors regardless of their size may be divided into the three basic categories of those having low, medium and high inductance characteristics. For a given motor there exists a firing angle which may be programmed as a function of the motor speed. The table below which compares percent of full speed to the firing angle to give a desired percentage, for example 150 percent of rated current, illustrates this known characteristic of the motor.

| Percent of Rated Speed | Firing Angle for 150 Percent of Rated Armature Current |
| --- | --- |
| 0 | 60° |
| 25 | 70° |
| 50 | 80° |
| 75 | 90° |
| 100 | 100° |

The values in the above table might be considered typical for those of a medium inductance motor. A high inductance motor for the same type of table might require a firing angle of from 5° to 10° greater for each of the percentages of rated speed while a low inductance motor might require a firing angle of from 5° to 10° less than those indicated. The setting on the potentiometer, therefore, is one which will present a basic program for the motor being used. This program, that is the setting of the potentiometer, is one corresponding to a given percent of rated current, at a given speed. Typically, this is 150 percent of rated current at stall or zero speed. As an alternative to the infinitely variable potentiometer 56 shown, a system which is designed to operate on a limited number of motors might have a tapped potentiometer such that a given number of settings is available. For example, one for low, one for medium and one for high inductance motors.

Figure 4:
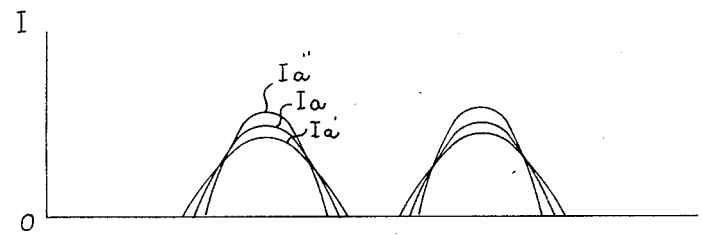

FIG. 4 illustrates the effect of inductance variation of different motors. Here the three current graphs all have the same average value which may be 150 percent of rated full load current. The center current curve, designated $I_a$, represents the current which would exist in a medium inductance motor at a firing angle of approximately 60°, whereas a higher inductance motor would require a 70° firing angle to achieve the same current as shown by the curve $I_a'$. In a similar manner, a low inductance motor current might require only a 500° firing angle to achieve the desired percentage of rated current as shown at $I_a''$.

Figure 5:
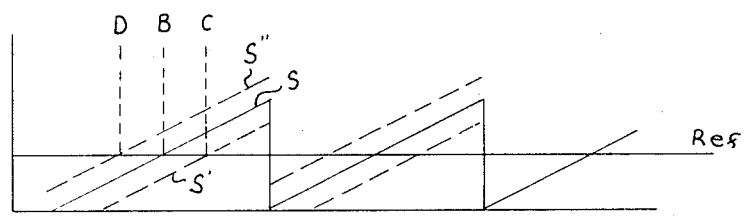

The ramp function generator 40 shown in FIG. 1 is programmed to provide a signal which will be equal to the signal from the reference potentiometer 56 at the time within the operating half cycle which will give the proper thyristor firing angle to achieve the current described above. That is, assuming the use of a medium inductance motor which reaches 150 percent of rated current with a 60° firing angle at the stall condition, the ramp function generator would be designed to provide a signal of a magnitude equal to that from the potentiometer 56 at that point within the operational cycle at a 60° firing angle (120° into the half cycle). This feature is illustrated in FIG. 5 wherein the horizontal line designated "REF" indicates the signal from the potentiometer 56 on line 52. The sloped line S represents the signal from the ramp function generator 42 which is initiated at approximately 30° into the half cycle, as previously explained, by the signal on line 38 from the pulse shifting circuit 36. The ramp function generator output will increase at a prescribed rate so that the value of the signal on line 42 will equal that of the reference on line 52 at the appropriate firing angle at the stall condition for the motor being used. In the present example, this intersection occurs at point B representing a thyristor firing angle of 60°. If a low inductance motor were to be used, the reference potentiometer 56 would be adjusted to provide a slightly higher reference signal and the intersection would occur later in time, for example at 130° into the half cycle (50° firing angle). Conversely, if a high inductance motor were to be used, the reference potentiometer would be set to provide a lower reference signal and the intersection would occur earlier in time. In the examples here being used, this intersection would be at 110° into the half cycle (70° firing angle).

Returning now to FIG. 1, the operation of the present invention is as follows. At a point within each half cycle as determined by the phase shifting circuit 36 there is provided a signal on line 38 to initiate the operation of the ramp function generator 40 to provide a first input to the summing junction 44. The second input to the junction 44, the signal on line 46, is as previously indicated proportional to the armature voltage. The signal on 46 is properly scaled such that if the motor is running at a speed higher than stall, the summing junction 44 adds the signal on 46 to the ramp function generator signal on line 42. Thus, the signal on line 48 would be higher than the output of the generator 40 and the time at which the signal comparison circuit would release the thyristor firing circuit 28 would be earlier. In FIG. 5, this effect is shown as line S'' which line intersects the reference signal line at a point D which is earlier in time than point B. The net result is that the bridge thyristors are fired earlier in the half cycle and a greater effective voltage is applied to the armature 20 in order to keep the armature current constant. Conversely, if the motor is being driven in the reverse direction by its load, signal on line 46 is subtracted from the ramp function signal to decrease the value of the signal on line 48 as is shown by a line S' in FIG. 5. In this situation the release of the thyristor firing circuit 28 occurs at a later time to thus apply a lower effective voltage and to again maintain the armature current constant. Thus, at any operating speed, forward or reverse, in the rated speed range, a signal representative of the back emf at point 34 (FIG. 1) is provided on line 46 to the summing junction 44 so as to adjust the release point of the firing circuit 28 in the proper direction and by an appropriate amount to maintain the armature current substantially constant.

It was stated earlier that the preferred embodiment employs a full thyristor bridge as illustrated in FIG. 1. Very briefly, the full thyristor bridge 18 is desirable to insure that the current will, in each half cycle, be completely extinguished. That this occurs with a full thyristor bridge is more fully explained in the aforementioned Pat. application, Ser. No. 338,615. Briefly, however, it is recognized that for a given motor speed there is a true back emf and an angle of thyristor firing which will bring the current limit of the present invention to operation. If, for a given armature back emf, the firing angle is increased, the armature current will depend upon both the resistance and inductance of the armature so long as the current is extinguished for even a short period of time during each half cycle. Once the armature current becomes continuous, however, armature inductance no longer affects the current increase with an increase in effective voltage and the current becomes much more sensitive to increases in the firing angle of the thyristors. In addition, once the armature current becomes continuous, the voltage at point 34 of FIG. 1 is no longer a true representation to the back emf of the motor, there now being an IR component, and the accuracy of the system of the present invention is seriously diminished.

It was also noted that in the preferred embodiment the invention employs a phase shifting circuit 36 to preclude the initiation of the ramp function generator prior to a prescribed time within the operational cycle. This delay precludes the chance that the firing of a thyristor will take place anywhere in the prescribed early portion of the cycle. In certain situations, such as when the motor is operating at a relatively high speed level, if the thyristor firing circuit were to attempt to fire the thyristors early in the half cycle, the existence of a motor back emf higher than the line voltage at that time would reverse bias the thyristor and preclude its firing. This may best be illustrated by an example as follows. Let it first be assumed that the motor is running at a steady state and that the thyristors are being fired at approximately 100°. Assume next that the thyristor firing circuit is adjusted to call for an increase in speed of a magnitude such that the thyristor firing circuit would normally go to full advance and would request that the thyristors fire for the full 180° of the half cycle. Because the thyristor firing circuit 28 common in the art normally applies only a pulse to the thyristors to initiate their conduction and does not maintain a signal on the thyristor gate, it is readily seen that is a sufficiently high armature back emf exists to back bias those thyristors, then the pulse applied would be of no effect and that the thyristor would not fire. The motor would then begin to slow down compounding the problem and correction would not normally be achieved until such time as the back emf of the motor was substantially zero. Thus, the inclusion of the pulse shifting circuit 36 to insure at least a prescribed delay in firing within each half cycle is a highly desirable feature.

Figure 6:
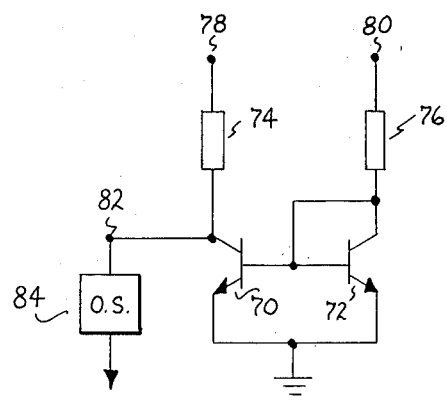

The above description of the invention has been made discussing signal values. As previously mentioned, the signals could be either voltage signals or current signals and the depiction of FIG. 1 is essentially that which would normally be considered as applicable to voltage signals. However, it is readily within the ordinary skill in the art to convert these signals to current signals and in this respect FIG. 6 is included as showing an appropriate signal comparison circuit employing current signals. FIG. 6 shows a current comparator including a pair of transistors 70 and 72 which are preferably of matched electrical characteristics. Preferably the transistors 70 and 72 are made on a single monolithic substrate as by being part of an integrated circuit. The bases of the two transistors are joined together and have applied thereto a common voltage. The base of transistor 72 is tied to its collector in a feedback arrangement which caused the total current in that transistor to divide between the base and collector in accordance with the current gain of the transistor. In each of the collector leads of the two transistors 70 and 72 is a resistor designated respectively by the reference characters 74 and 76 which resistors are for scaling the amount of current and which if desired may be made variable so that the point of operation of the circuit may be varied. The emitters of the two transistors are shown connected to a common bus or ground. A terminal 78 is connected to the free end of resistor 74 a second terminal 80 is connected to the free end of the resistor 76.

In the application of this circuit to the embodiment of FIG. 1, terminal 78 would have applied thereto the signal on line 48 and the terminal 80 would have applied thereto the signal on line 52. Transistor 72 would, therefore, have essentially a steady state collector to emitter current. Transistor 70 would have a collector to emitter current which varies in accordance with the value of the applied signal. When the current in the collector to emitter circuit of transistor 70 is less than that in transistor 72, transistor 70 is in saturation and there is essentially no voltage at its collector which may be determined or recognized at the terminal 82 as shown in FIG. 6. When, however, the collector to emitter current of transistor 70 exceeds that of transistor 72, transistor 70 is pulled out of saturation and the voltage at its collector, as may be seen at point 82 will begin to rise. This increase in voltage may be used to trigger an appropriate pulse generator such as a one shot multivibrator 84 the output of which may be employed to release the thyristor firing circuit 28.

While there has been shown and described what is at present considered to be the preferred embodiment of the invention, modifications thereto will readily occur to those skilled in the art. It is not intended, therefore, that the present invention be limited to that specifically shown and described but that the claims appended hereto be given full consideration with respect to the true scope and spirit of the invention.

What is claimed is:

1. A control circuit, for a direct current motor having an armature winding and a field winding, of the type employing phase controlled rectifiers to vary the effective voltage applied from an alternating current source to said motor, said control circuit comprising:
    a. means to determine the armature winding voltage and to provide a first signal proportional thereto;
    b. means to generate a second signal of varying magnitude beginning at a prescribed time after the beginning of each half cycle of said alternating current source;
    c. a reference signal generating means for generating a reference signal proportional to a desired phase angle of rendering said rectifiers conductive; and,
    d. means for combining said first, second and third signals to provide an inhibit signal operative to prevent the rendering of the controlled rectifiers conductive until said first, second and third signals are of a prescribed relationship.

2. The invention in accordance with claim 1 wherein said means to generate the second signal is a ramp function generator.

3. The invention in accordance with claim 1 wherein there is further included a phase displacement circuit for initiating the operation of the means to generate the second signal.

4. A control circuit, for a direct current motor having an armature winding and a field winding, of the type employing phase controlled rectifiers to vary the effective voltage applied from an alternating current source to said motor, said control circuit comprising:
   a. means to determine the armature winding voltage and to provide a first signal proportional thereto;
   b. means to generate a second signal of varying magnitude beginning at a prescribed time after the beginning of each half cycle of said alternating current source;
   c. combining means to combine said first and second signals and to provide an output signal indicative thereof;
   d. a reference signal generating means for generating a reference signal proportional to a desired phase angle of rendering said rectifiers conductive; and,
   e. means to compare said output signal and said reference signal to provide an inhibit signal operative to prevent the rendering of the controlled rectifiers conductive until said reference signal and said output signal are of a prescribed relationship.

5. The invention in accordance with claim 4 wherein said means to generate the second signal is a ramp function generator.

6. The invention in accordance with claim 4 wherein there is further included a phase displacement circuit for initiating the operation of the means to generate the second signal.

7. The invention in accordance with claim 4 wherein said output signal and said reference signals are both current signals and said means to compare those signals includes a pair of transistors having matched electrical characteristics and having a common voltage applied to a base of each of said transistors.

8. The invention in accordance with claim 4 wherein said prescribed relationship is determined by the reference signal being greater than the output signal.

9. A control circuit for a direct current motor having an armature winding and a field winding supplied from a source of alternating current power, said control circuit comprising:
   a. a full wave rectification bridge for supplying unidirectional power from said source to said armature winding, said bridge having a controllable rectifier in each leg thereof;
   b. a firing circuit for rendering said rectifiers conductive at a prescribed phase angle with respect to the power from said source;
   c. means to determine the voltage of the armature winding and to provide a first signal proportional thereto;
   d. means to generate a second signal of varying magnitude beginning at a prescribed point in each half cycle of said alternating current source;
   e. combining means to combine said first and second signals and to provide an output signal indicative thereof;
   f. a reference signal generating means for generating a reference signal proportional to a desired phase angle of firing of said rectifiers; and,
   g. means to compare said output signal and said reference signal to provide an inhibit signal operative to prevent the firing of the control rectifiers so long as the value of said reference signal exceeds that of said output signal.

10. The invention in accordance with claim 9 wherein said controlled rectifiers are thyristors.

11. The invention in accordance with claim 9 wherein said means to generate the second signal is a ramp function generator.

12. The invention in accordance with claim 9 wherein there is further included a phase displacement circuit for initiating the operation of the means to generate the second signal.

13. The invention in accordance with claim 9 wherein said output signals and said reference signals are both current signals and said means to compare those signals includes a pair of transistors having matched electrical characteristics and having a common voltage applied to a base of each of said transistors.

14. A control circuit for a direct current motor having an armature winding adapted to be supplied with power from an alternating current power source through a thyristor rectifying bridge source, said control circuit comprising:
   a. a firing circuit for rendering the thyristors of said bridge conductive at a prescribed phase angle with respect to the voltage of the source;
   b. means to generate a first signal proportional to the current in said armature winding;
   c. means to generate a second signal of varying magnitude beginning a prescribed time in each half cycle of said alternating current source;
   d. combining means to combine said first and second signals and to provide an output signal indicative thereof;
   e. a reference signal generating means for generating a reference signal proportional to a desired phase angle for the rendering of the thyristors conductive; and,
   f. means to compare said output signal and said reference signal to provide an inhibit signal operative to inhibit the operation of said firing circuit until said reference signal and said output signal are of a prescribed relationship.

15. The invention in accordance with claim 14 wherein prescribed relationship is determined by the reference signal being greater than the output signal.

16. The invention in accordance with claim 14 wherein said means to generate the second signal is a ramp function generator.

17. The invention in accordance with claim 14 wherein there is further included a phase displacement circuit for initiating the operation of the means to generate the second signal.

18. The invention in accordance with claim 14 wherein said output signal and said reference signals are both current signals and said means to compare those signals includes a pair of transistors having matched electrical characteristics and having a common voltage applied to a base of each of said transistors.

19. The invention in accordance with claim 14 wherein said reference signal generating means is adjustable.

* * * * *